US009179336B2

(12) United States Patent
Fink et al.

(10) Patent No.: US 9,179,336 B2
(45) Date of Patent: Nov. 3, 2015

(54) WIFI MANAGEMENT INTERFACE FOR MICROWAVE RADIO AND RESET TO FACTORY DEFAULTS

(71) Applicants: Jaime Fink, San Francisco, CA (US); David Gurevich, San Mateo, CA (US)

(72) Inventors: Jaime Fink, San Francisco, CA (US); David Gurevich, San Mateo, CA (US)

(73) Assignee: Mimosa Networks, Inc., Campbell, CA (US)

( * ) Notice: Subject to any disclaimer, the term of this patent is extended or adjusted under 35 U.S.C. 154(b) by 0 days.

(21) Appl. No.: 14/183,445

(22) Filed: Feb. 18, 2014

(65) Prior Publication Data

US 2014/0233613 A1 Aug. 21, 2014

Related U.S. Application Data

(60) Provisional application No. 61/766,667, filed on Feb. 19, 2013.

(51) Int. Cl.
*H04B 1/38* (2015.01)
*H04W 24/02* (2009.01)

(52) U.S. Cl.
CPC *H04W 24/02* (2013.01); *H04B 1/38* (2013.01)

(58) Field of Classification Search
USPC ........................... 375/219, 224, 259, 295, 316
See application file for complete search history.

(56) References Cited

U.S. PATENT DOCUMENTS

| 2,735,993 | A | 2/1956 | Humphrey |
| 4,402,566 | A | 9/1983 | Powell et al. |
| 4,986,764 | A | 1/1991 | Eaby et al. |
| 5,015,195 | A | 5/1991 | Piriz |
| 5,226,837 | A | 7/1993 | Cinibulk et al. |
| 5,513,380 | A | 4/1996 | Ivanov et al. |
| 5,580,264 | A | 12/1996 | Aoyama et al. |
| 5,746,611 | A | 5/1998 | Brown et al. |
| 6,176,739 | B1 | 1/2001 | Denlinger et al. |
| 6,421,538 | B1 | 7/2002 | Byrne |
| 6,716,063 | B1 | 4/2004 | Bryant et al. |
| 6,754,511 | B1 | 6/2004 | Halford et al. |

(Continued)

FOREIGN PATENT DOCUMENTS

| EP | 002640177 | 2/2015 |
| WO | WO2014137370 | 9/2014 |

(Continued)

OTHER PUBLICATIONS

International Search Report and Written Opinion of the International Search Authority mailed Nov. 26, 2013 in Patent Cooperation Treaty Application No. PCT/US2013/047406, filed Jun. 24, 2013.

(Continued)

*Primary Examiner* — Khanh C Tran
(74) *Attorney, Agent, or Firm* — Carr & Ferrell LLP

(57) ABSTRACT

WIFI management interfaces for microwave radio and reset to factory defaults are provided herein. Methods may include transmitting or receiving, on a dedicated management interface antenna of the wireless radio management signals, signals in a dedicated band for controlling operations of the wireless radio, and transmitting or receiving, on at least one additional antenna of the wireless radio management signals, signals that are not used for controlling operations of the wireless radio. The dedicated management interface antenna and the at least one additional antenna being physically separated from one another.

15 Claims, 9 Drawing Sheets

(56) References Cited

U.S. PATENT DOCUMENTS

| | | | |
|---|---|---|---|
| 6,847,653 B1 | 1/2005 | Smiroldo | |
| 6,877,277 B2 | 4/2005 | Kussel et al. | |
| 6,962,445 B2 | 11/2005 | Zimmel et al. | |
| 7,264,494 B2 | 9/2007 | Kennedy et al. | |
| 7,281,856 B2 | 10/2007 | Grzegorzewska et al. | |
| 7,306,485 B2 | 12/2007 | Masuzaki | |
| 7,324,057 B2 | 1/2008 | Argaman et al. | |
| 7,380,984 B2 | 6/2008 | Wuester | |
| 7,431,602 B2 | 10/2008 | Corona | |
| 7,507,105 B1 | 3/2009 | Peters et al. | |
| 7,542,717 B2 | 6/2009 | Green, Sr. et al. | |
| 7,581,976 B2 | 9/2009 | Liepold et al. | |
| 7,616,959 B2 | 11/2009 | Spenik et al. | |
| 7,726,997 B2 | 6/2010 | Kennedy et al. | |
| 7,778,226 B2 | 8/2010 | Rayzman et al. | |
| 7,857,523 B2 | 12/2010 | Masuzaki | |
| RE42,522 E | 7/2011 | Zimmel et al. | |
| 8,069,465 B1 * | 11/2011 | Bartholomay et al. | 725/116 |
| 8,515,434 B1 | 8/2013 | Narendran et al. | |
| 8,777,660 B2 | 7/2014 | Chiarelli et al. | |
| 8,792,759 B2 | 7/2014 | Benton et al. | |
| 8,827,729 B2 | 9/2014 | Gunreben et al. | |
| 9,001,689 B1 | 4/2015 | Hinman et al. | |
| 2002/0102948 A1 | 8/2002 | Stanwood et al. | |
| 2002/0159434 A1 | 10/2002 | Gosior et al. | |
| 2003/0013452 A1 | 1/2003 | Hunt et al. | |
| 2003/0027577 A1 | 2/2003 | Brown et al. | |
| 2003/0224741 A1 | 12/2003 | Sugar et al. | |
| 2004/0029549 A1 | 2/2004 | Fikart | |
| 2004/0120277 A1 | 6/2004 | Holur et al. | |
| 2004/0240376 A1 | 12/2004 | Wang et al. | |
| 2005/0032479 A1 | 2/2005 | Miller et al. | |
| 2005/0195758 A1 | 9/2005 | Chitrapu | |
| 2005/0227625 A1 | 10/2005 | Diener | |
| 2006/0072518 A1 | 4/2006 | Pan et al. | |
| 2006/0172578 A1 | 8/2006 | Parsons | |
| 2006/0187952 A1 | 8/2006 | Kappes et al. | |
| 2007/0001910 A1 | 1/2007 | Yamanaka et al. | |
| 2007/0019664 A1 | 1/2007 | Benveniste | |
| 2007/0060158 A1 | 3/2007 | Medepalli et al. | |
| 2007/0173199 A1 | 7/2007 | Sinha | |
| 2007/0173260 A1 | 7/2007 | Love et al. | |
| 2007/0223701 A1 | 9/2007 | Emeott et al. | |
| 2007/0238482 A1 | 10/2007 | Rayzman et al. | |
| 2007/0268848 A1 | 11/2007 | Khandekar et al. | |
| 2008/0109051 A1 * | 5/2008 | Splinter et al. | 607/60 |
| 2008/0112380 A1 | 5/2008 | Fischer | |
| 2008/0242342 A1 | 10/2008 | Rofougaran | |
| 2009/0052362 A1 | 2/2009 | Meier et al. | |
| 2009/0232026 A1 * | 9/2009 | Lu | 370/254 |
| 2009/0233475 A1 | 9/2009 | Mildon et al. | |
| 2009/0291690 A1 | 11/2009 | Guvenc et al. | |
| 2010/0029282 A1 | 2/2010 | Stamoulis et al. | |
| 2010/0046650 A1 | 2/2010 | Jongren et al. | |
| 2010/0103065 A1 | 4/2010 | Shtrom et al. | |
| 2010/0103066 A1 | 4/2010 | Shtrom et al. | |
| 2010/0171675 A1 | 7/2010 | Borja et al. | |
| 2010/0189005 A1 | 7/2010 | Bertani et al. | |
| 2010/0210147 A1 | 8/2010 | Hauser | |
| 2010/0315307 A1 | 12/2010 | Syed et al. | |
| 2011/0006956 A1 | 1/2011 | McCown | |
| 2011/0028097 A1 | 2/2011 | Memik et al. | |
| 2011/0044186 A1 | 2/2011 | Jung et al. | |
| 2011/0103309 A1 | 5/2011 | Wang et al. | |
| 2011/0170424 A1 | 7/2011 | Safavi | |
| 2011/0172916 A1 | 7/2011 | Pakzad et al. | |
| 2011/0194644 A1 | 8/2011 | Liu et al. | |
| 2011/0243291 A1 * | 10/2011 | McAllister et al. | 375/376 |
| 2012/0008542 A1 | 1/2012 | Koleszar et al. | |
| 2012/0040700 A1 | 2/2012 | Gomes et al. | |
| 2012/0057533 A1 | 3/2012 | Junell et al. | |
| 2012/0134280 A1 | 5/2012 | Rotvold et al. | |
| 2012/0238201 A1 | 9/2012 | Du et al. | |
| 2012/0314634 A1 | 12/2012 | Sekhar | |
| 2013/0005350 A1 | 1/2013 | Campos et al. | |
| 2013/0023216 A1 | 1/2013 | Moscibroda et al. | |
| 2013/0176902 A1 | 7/2013 | Wentink et al. | |
| 2013/0182652 A1 | 7/2013 | Tong et al. | |
| 2013/0195081 A1 | 8/2013 | Merlin et al. | |
| 2013/0210457 A1 | 8/2013 | Kummetz | |
| 2013/0288735 A1 * | 10/2013 | Guo | 455/509 |
| 2014/0098748 A1 | 4/2014 | Chan et al. | |
| 2014/0145890 A1 | 5/2014 | Ramberg et al. | |
| 2014/0198867 A1 | 7/2014 | Sturkovich et al. | |
| 2014/0235244 A1 | 8/2014 | Hinman | |
| 2014/0253378 A1 | 9/2014 | Hinman | |
| 2014/0253402 A1 | 9/2014 | Hinman et al. | |
| 2014/0254700 A1 | 9/2014 | Hinman et al. | |
| 2014/0256166 A1 | 9/2014 | Ramos et al. | |
| 2014/0320303 A1 * | 10/2014 | Winter | 340/870.02 |
| 2014/0320377 A1 | 10/2014 | Cheng et al. | |
| 2014/0355578 A1 | 12/2014 | Fink et al. | |
| 2014/0355584 A1 | 12/2014 | Fink et al. | |
| 2015/0002335 A1 | 1/2015 | Hinman et al. | |

FOREIGN PATENT DOCUMENTS

| | | |
|---|---|---|
| WO | WO2014138292 | 9/2014 |
| WO | WO2014193394 | 12/2014 |

OTHER PUBLICATIONS

International Search Report and Written Opinion of the International Search Authority mailed Aug. 9, 2013 in Patent Cooperation Treaty Application No. PCT/US2013/043436, filed May 30, 2013.

International Search Report and Written Opinion of the International Search Authority mailed Jul. 1, 2014 in Patent Cooperation Treaty Application No. PCT/US2014/020880, filed Mar. 5, 2014.

International Search Report and Written Opinion of the International Search Authority mailed Jun. 29, 2015 in Patent Cooperation Treaty Application No. PCT/US2015/012285, filed Jan. 21, 2015.

First Official Notification mailed Jun. 15, 2015 in Chinese Design Patent Application 201530058063.8, filed Mar. 11, 2015.

* cited by examiner

`US 9,179,336 B2`

WIFI MANAGEMENT INTERFACE FOR MICROWAVE RADIO AND RESET TO FACTORY DEFAULTS

CROSS REFERENCE TO RELATED APPLICATIONS

This application claims the priority benefit of U.S. Provisional Application Ser. No. 61/766,667, filed on Feb. 19, 2013, titled "WIFI MANAGEMENT INTERFACE FOR MICROWAVE RADIO AND RESET TO FACTORY DEFAULTS", which is hereby incorporated by reference herein in its entirety including all references cited therein.

FIELD OF THE INVENTION

The present technology may be generally described as providing a WiFi Management Interface for Microwave Radio and Reset to Factory Defaults.

BACKGROUND

Resetting of microwave radio devices often requires direct access to physical ports (e.g., Ethernet or craft) ports of a radio. Unfortunately, these devices are often installed on towers, which make physical access difficult.

SUMMARY

In some embodiments, the present technology may be directed to a wireless radio, comprising: (a) at least one antenna for transmitting or receiving signals, the at least one antenna using a first interface; and (b) a dedicated management interface antenna providing a wireless interface that is used to manage and configured the wireless radio.

In some embodiments, the present technology may be directed to a method for controlling a wireless radio. The wireless radio comprises a processor and a memory for storing executable instructions. The processor executes the instructions to perform the method, comprising: (a) transmitting or receiving, on a dedicated management interface antenna of the wireless radio management signals, signals in a dedicated band for controlling operations of the wireless radio; and (b) transmitting or receiving, on at least one additional antenna of the wireless radio management signals, signals that are not used for controlling operations of the wireless radio, wherein the dedicated management interface antenna and the at least one additional antenna are physically separated from one another.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1A:
FIG. 1A are front and rear perspective views of an exemplary enclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology contemplates adding a 2.4 GHz/5 GHz WiFi radio to a microwave radio operating in a separate band, which provides a simple means for a technician to configure and manage the microwave radio when onsite. Prior approaches have involved an electrical connection to the microwave radio through either Ethernet or a "craft port" (typically RS-232). Benefits of the WiFi approach are convenience (using cell phone instead of a wired laptop connection) and the ability to reset the radio to factory defaults without requiring a local or remote reset button.

A technician can reset a microwave radio to factory defaults by using the 2.4 GHz wireless interface. The process involves disconnecting the Ethernet interface from the network and power cycling the radio. Upon powering up the device, the 2.4 GHz interface starts up in a "reset" configuration with a specific reset SSID. The interface is shutdown after a set time interval unless the client associates. The present technology allows a technician to easily reset and reconfigure a wireless radio when, for example, the technician has forgotten a password for the wireless radio. Often times these radios are placed in locations where access to the radio is difficult or dangerous. The use of a dedicated antenna and band, as well as management interfaces allow for efficient resetting and reconfiguring of a wireless radio.

It will be understood that in some instances, the SSID may include an SSID that includes special characters such as letters or numbers that signify that the device is in a recovery mode, for example, "RESET" or "RECOVER", although other characters may also be utilized. Knowing the SSID, the technician may access the device's configurations via the management interface via entering a unique device identifier, which may correspond to the serial number of the radio. Thus, with the recovery SSID and the unique device identifier (or other authentication credentials), the technician may reconfigure the settings of the radio via the management interface (see FIG. 3).

These features allow for technicians to reset the settings of the radio device, such as when the IP address for the radio is lost or if authentication credentials for the radio device are lost. Such wireless reconfiguration features allow for simplified commissioning and decommissioning of devices without need for careful device configuration maintenance.

Figure 1B:
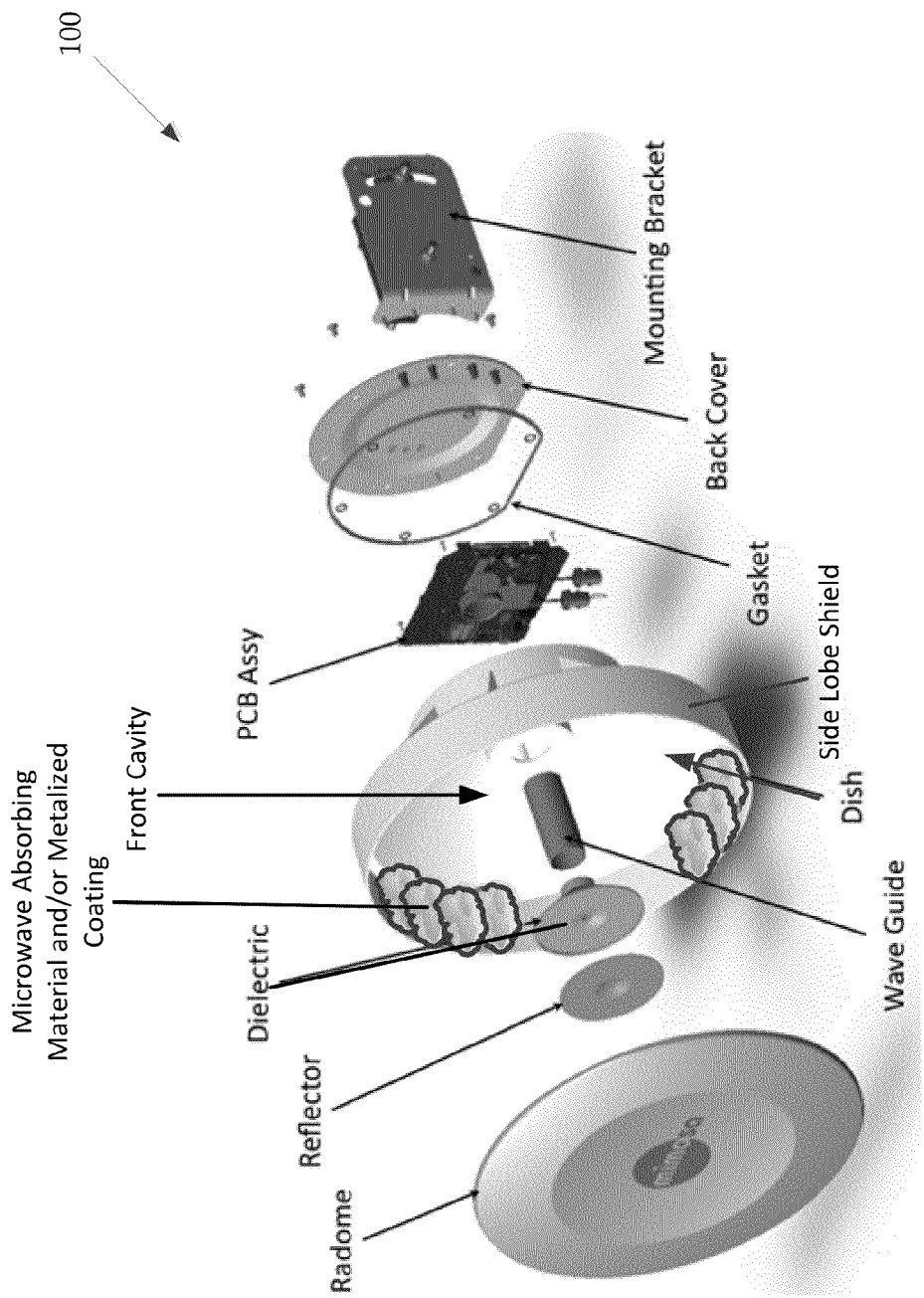
FIG. 1B is an exploded perspective view of the exemplary enclosure of FIG. 1A.
Figure 1C:
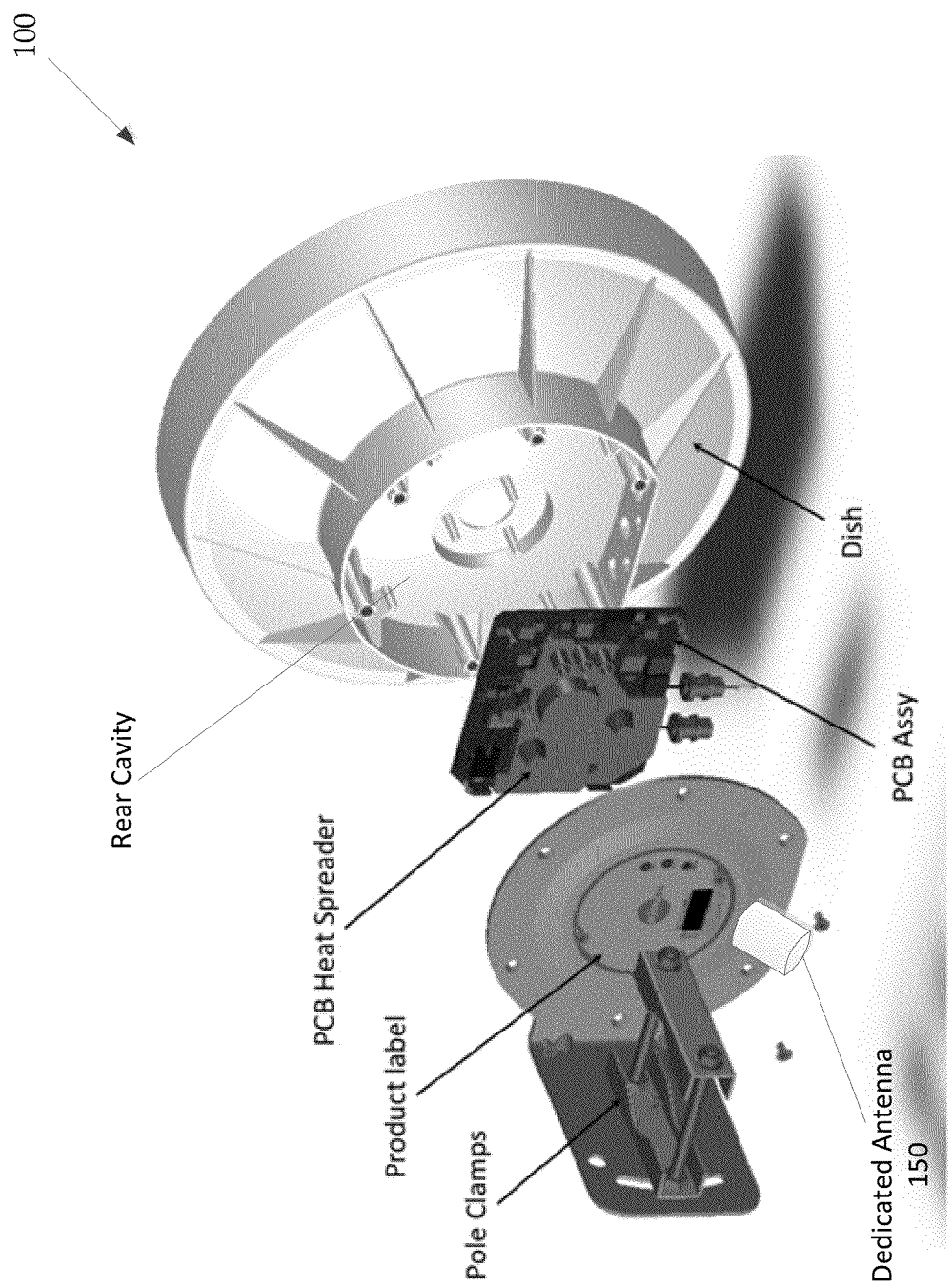
FIG. 1C is an exploded perspective view of the exemplary enclosure of FIGS. 1A-B, shown from the rear.

FIGS. 1A-C collectively illustrate an exemplary device 100 that includes a WiFi management interface (FIG. 3) and utilizes a dedicated antenna 150. It will be understood that while the management interface and dedicated antenna 150 have been described as being utilized with the device 100, one of ordinary skill in the art will appreciate that any suitable radio antenna that is capable of being rest to factory default settings may also likewise utilize the present technology.

While the present technology may be utilized in conjunction with the device of FIGS. 1A-C, it will be understood that the 2.4 Ghz/5 Ghz wireless interface configuration and management methods/systems provided herein may also likewise be utilized with other suitable devices or systems, as would be apparent to one of ordinary skill in the art with the present disclosure before them. Thus, FIGS. 1A-C and their accompanying descriptions are intended to be viewed as an example of a device that can be configured using the present technology. Therefore, the description and FIGS. 1A-C should not be viewed as limiting the present technology in any specific manner unless specifically stated to be limiting or claimed as limiting.

The device 100 may comprise a mounting bracket that allows the device 100 to be pivotally coupled to a mounting surface, such as a tower (not shown). The ability of the device 100 to be pivotally connected to a mounting surface allows for an azimuth angle to be established, as would be known to one of ordinary skill in the art with the present disclosure before them.

The mounting bracket may couple with a back cover via a plurality of fasteners. The device 100 also comprises a dish that is formed so as to include a rear cavity and a front cavity. A PCB assembly is disposed at least partially within the rear cavity of the dish. A seal, such as a gasket, may be disposed between the outer peripheral edge of the rear cavity and the back cover to sealingly protect the PCB assembly from contamination. The PCB assembly may also include a PCB heat spreader or other means for transferring heat generated by the PCB assembly to the ambient environment such as fans and so forth.

In some instances, the dish may include a side lobe shield that extends beyond the outer peripheral edge of the dish. In some instances the side lobe shield may include a shroud having a sidewall that forms a ring around the outer peripheral edge of an upper surface of the dish.

Advantageously, the inner surface of the side lobe shield may be provided with a metalized coating. The upper surface of the dish may also include a metalized coating. In some instances at least a portion of the inner surface of the side lobe shield may be augmented with a metallic coating and/or a microwave absorbing material, such as a foam or other electrically insulating material that is coated along the inner surface of the front cavity of the dish. The microwave absorbing material is shown as being disposed within the front cavity, but may also be applied or sprayed to the inner surface of the side lobe shield. In other instances, the microwave absorbing material may be integrated into the side lobe shield itself. An exemplary metalized coating of the upper surface of the dish and the inner sidewall of the side lobe shield is illustrated in Photos A, B, and E, which are attached hereto.

Because the side lobe shield extends beyond the outer peripheral edge of the dish, the side lobe shield functions to direct the signals reflected by the dish surface in a more uniform and directed pattern. For example, the side lobe shield may reduce side lobe radiation which is transmitted from and/or received by the device. Thus, the device 100 may reduce an amount of signals which are received by the device 100 that are transmitted by adjacent transmitters. Also, the side lobe shield of the device 100 may also reduce an amount of microwave signals transmitted via side lobe projection by the device. Thus, the device 100 reduces both the transmission and reception of deleterious side lobe signals.

The device 100 may also comprise a wave guide that is communicatively coupled with the PCB assembly. A cylindrical dielectric plate may couple with the wave guide. Also, a reflector may be associated with the dielectric plate. The combination of the PCB assembly, wave guide, dielectric plate, and reflector may collectively be referred to as a "radio." A radome cover attaches to the side lobe shield to sealingly cover the reflector, dielectric, and wave guide that are housed within the front cavity.

It will be understood that the radome, side lobe shield, dish, and back cover of the device 100 may be constructed from any suitable material such as a plastic, a polymeric material, a resin, a composite material, a natural material, or any other material that would be known to one of ordinary skill in the art.

The dedicated antenna 150 provides for directional communication with a technician, wirelessly. The dedicated antenna 150 may be pointed generally to a location of interaction, such as where a technician will be typically located. For example, if the device 100 is on a tower, the dedicated antenna 150 may point towards the base of the tower. Advantageously, the dedicated antenna 150 may be configured to minimize interference.

The dedicated antenna 150 may communicatively couple with and may be controlled by the PCB assembly. The dedicated antenna 150 may communicate on a channel that is distinct from the channel used by the radio assembly of the device 100 to prevent interference with the broadcast signals transmitted and received by the device 100. Stated otherwise, the dedicated antenna 150 may allow for wireless communications over an out-of-bandwidth channel, which reduces signal interference.

Figure 2:
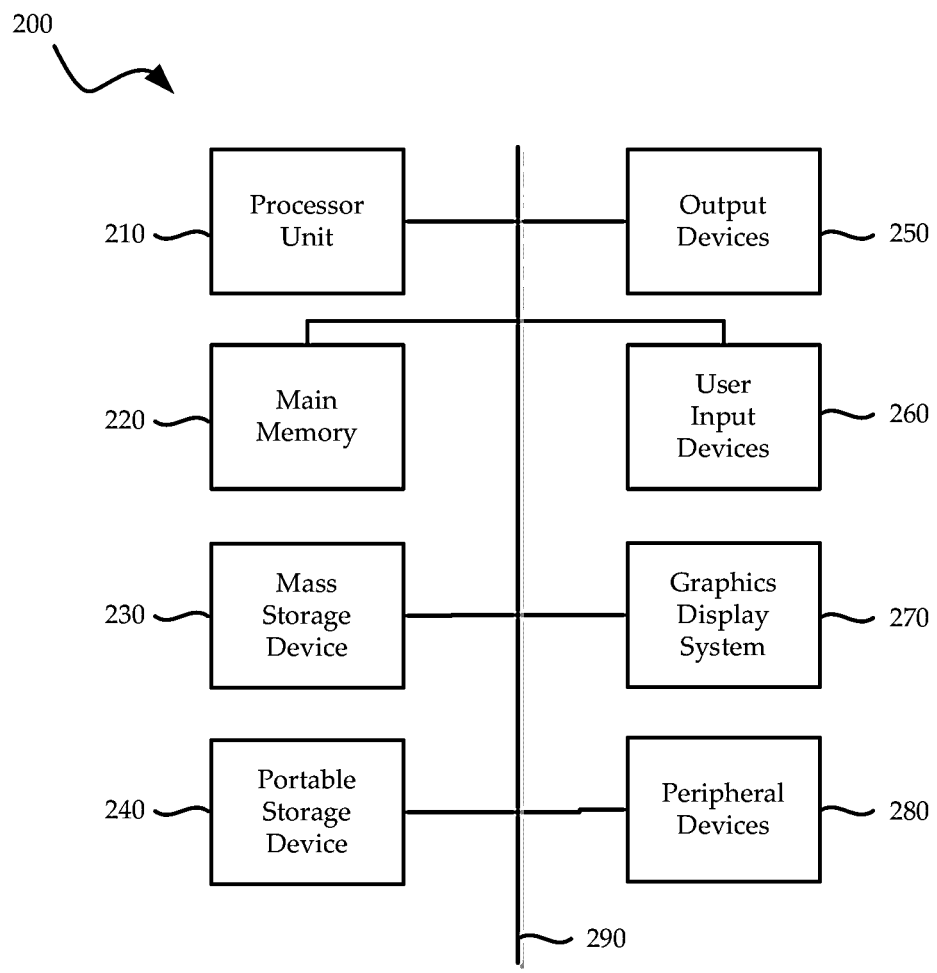
FIG. 2 illustrates an exemplary computing device that may be used to implement embodiments according to the present technology.

FIG. 2 illustrates an exemplary computing device 200 that may be used to implement an embodiment of the present technology. The computing device 200 of FIG. 2 includes one or more processors 210 and memory 220. The computing device 200 may be utilized to control one or more functions via the PCB assembly of device 100 of FIG. 1. In some instances, the processor 210 and memory 220 may be integrated into the PCB assembly. Exemplary functions executed by the processor 210 and stored in memory 220 may include, but are not limited to transmission and/or receipt of signals, as well as signal processing commonly utilized with 2×2 (or greater) multiple input, multiple output (MIMO) transceivers. Additional functions include providing a management interface (GUI) that allows technicians to configure settings for the radio system. Additionally, a remote reset feature may also be programmed into the radio system.

The Main memory 220 stores, in part, instructions and data for execution by processor 210. Main memory 220 can store the executable code when the computing device 200 is in operation. The computing device 200 of FIG. 2 may further include a mass storage device 230, portable storage medium drive(s) 240, output devices 250, user input devices 260, a graphics display 270, and other peripheral devices 280.

The components shown in FIG. 2 are depicted as being connected via a single bus 290. The components may be connected through one or more data transport means. Processor unit 210 and main memory 220 may be connected via a local microprocessor bus, and the mass storage device 230, peripheral device(s) 280, portable storage device 240, and graphics display 270 may be connected via one or more input/output (I/O) buses.

Mass storage device 230, which may be implemented with a magnetic disk drive, an optical disk drive, and/or a solid-state drive is a non-volatile storage device for storing data and instructions for use by processor unit 210. Mass storage device 230 can store the system software for implementing embodiments of the present technology for purposes of loading that software into main memory 220.

Portable storage device 240 operates in conjunction with a portable non-volatile storage medium, such as a floppy disk, compact disk or digital video disc, to input and output data and code to and from the computing device 200 of FIG. 2. The system software for implementing embodiments of the present technology may be stored on such a portable medium and input to the computing device 200 via the portable storage device 240.

Input devices 260 provide a portion of a user interface. Input devices 260 may include an alphanumeric keypad, such as a keyboard, for inputting alphanumeric and other information, or a pointing device, such as a mouse, a trackball, stylus, or cursor direction keys. Additionally, the computing device 200 as shown in FIG. 2 includes output devices 250. Suitable output devices include speakers, printers, network interfaces, and monitors.

Graphics display 270 may include a liquid crystal display (LCD) or other suitable display device. Graphics display 270 receives textual and graphical information, and processes the information for output to the display device.

Peripheral device(s) 280 may include any type of computer support device to add additional functionality to the computing device. Peripheral device(s) 280 may include a modem or a router.

The components contained in the computing device 200 of FIG. 2 are those typically found in computing devices that may be suitable for use with embodiments of the present technology and are intended to represent a broad category of such computer components that are well known in the art. Thus, the computing device 200 of FIG. 2 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Figure 3:
FIGS. 3-6 are various exemplary management graphical user interfaces.
Figure 4:
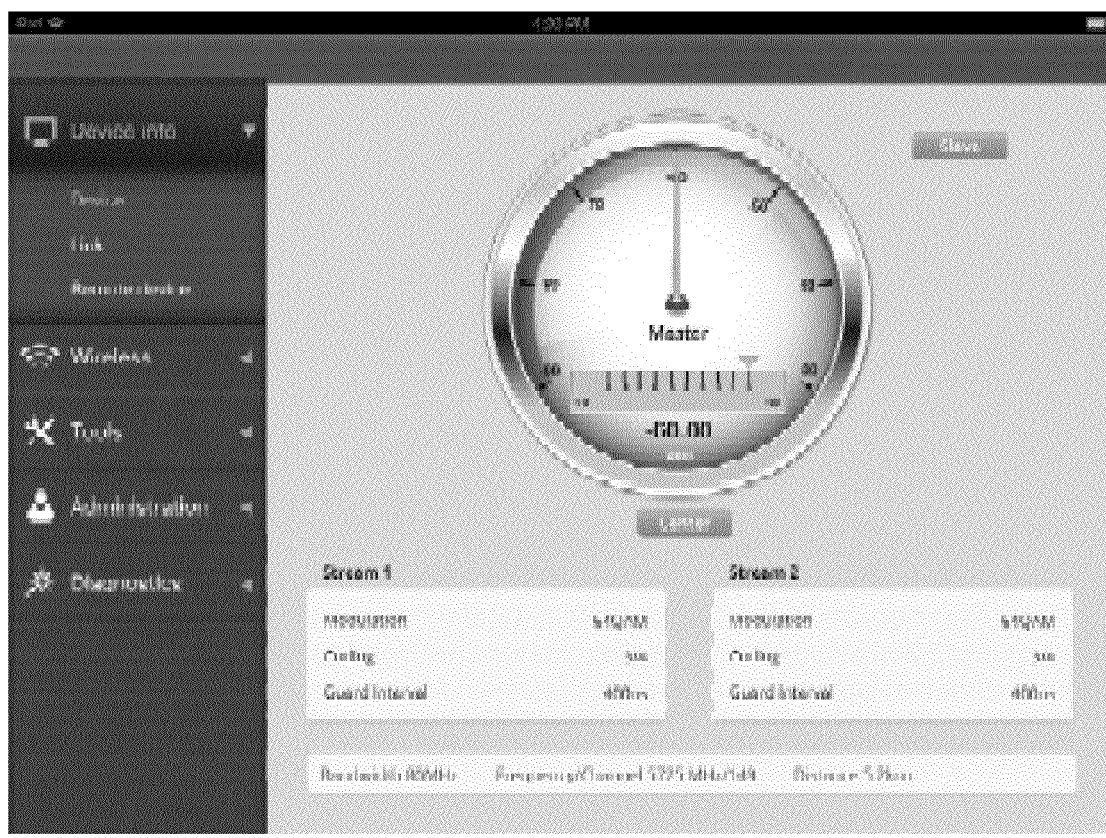
Figure 5:
Figure 6:
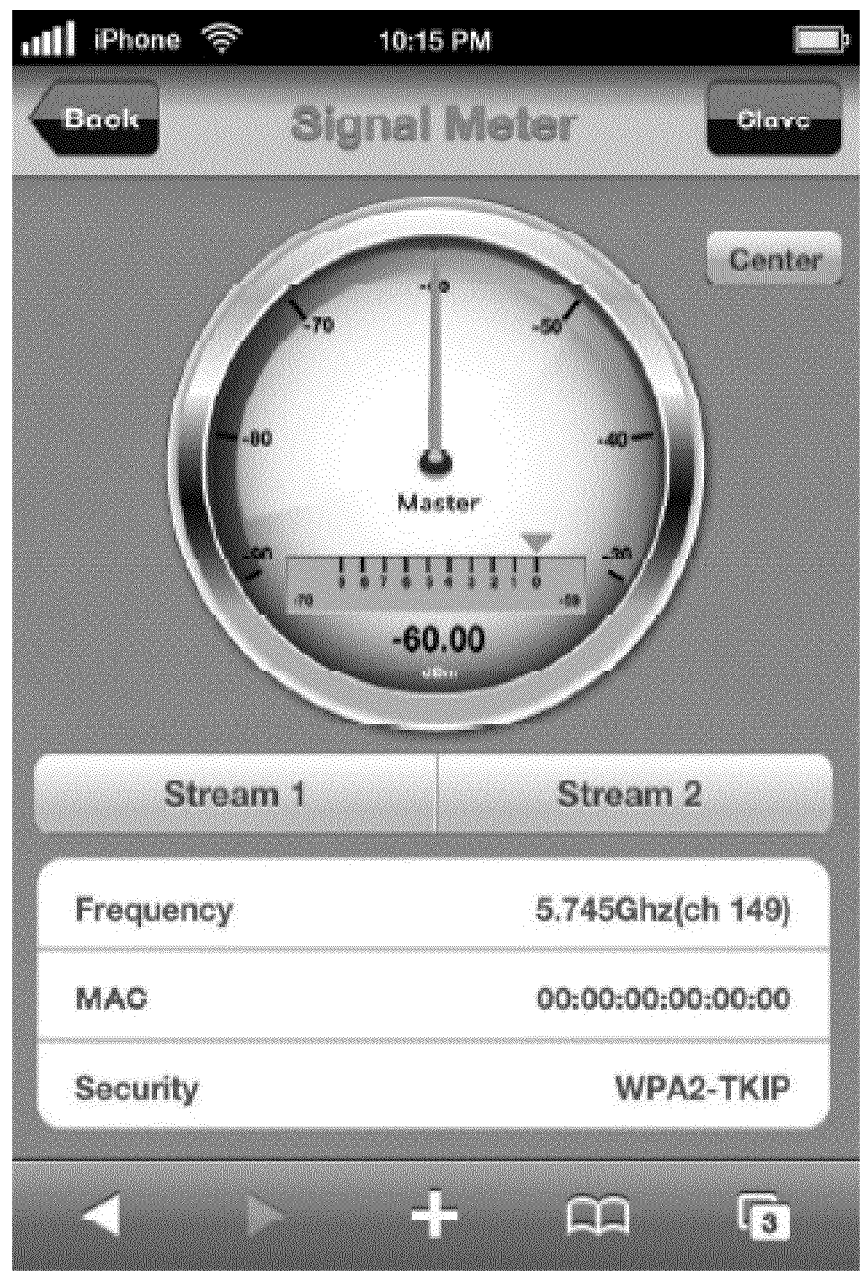

FIG. 3 illustrates an exemplary graphical user interface in the form of a login page that may be displayed on a mobile device, such as a tablet-style computing device. FIG. 4 illustrates an exemplary graphical user interface in the form of a management interface that allows a technician to control and configure a radio device in accordance with the present technology. FIGS. 5 and 6 are similar to FIGS. 3 and 4, respectively with the exception that FIGS. 5 and 6 are configured for display on a mobile device, such as a cellular telephone.

Figure 7:
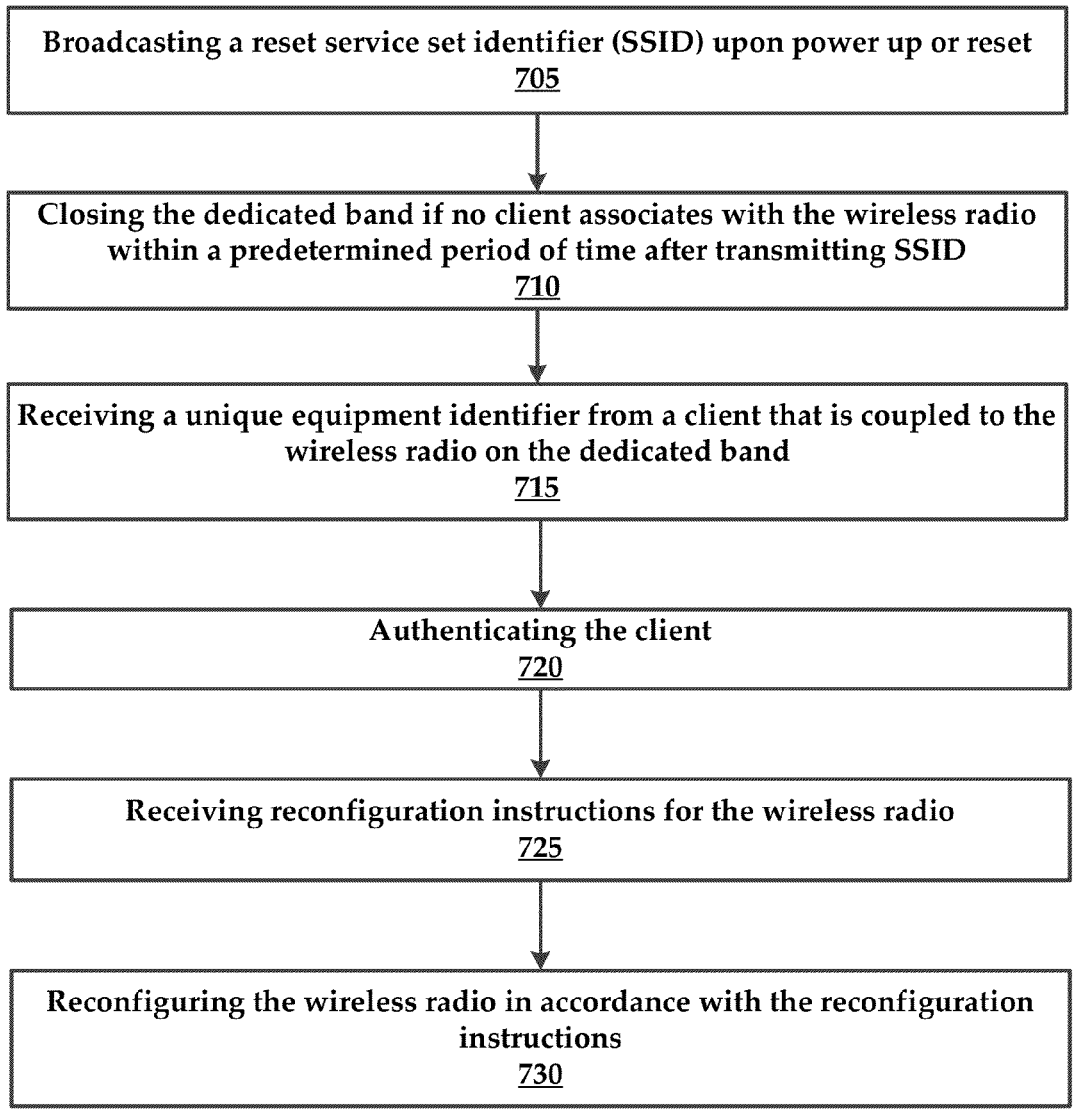
FIG. 7 is a flowchart of an exemplary method for controlling a wireless radio.

FIG. 7 is a flowchart of an exemplary method for controlling a wireless radio. In some embodiments, the method may include broadcasting 705 a reset service set identifier (SSID) upon power up or reset. As mentioned above, the SSID may include a set of characters that indicate to a technician that the wireless radio has been reset.

In some embodiments the method may include closing 710 the dedicated band if no client associates with the wireless radio within a predetermined period of time after transmitting SSID.

When a client couples with the radio on the dedicated band, the method may include receiving 715 a unique device identifier from a client that is coupled to the wireless radio on the dedicated band. This unique device identifier may be received via a management UI (e.g., login page as described above).

The method may include authenticating 720 the client and receiving 725 reconfiguration instructions for the wireless radio. Finally, the method may include reconfiguring 730 the wireless radio in accordance with the reconfiguration instructions.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A wireless radio, comprising:
   at least one antenna for transmitting or receiving signals, the at least one antenna using a first interface; and
   a dedicated management interface antenna providing a wireless interface that is used to manage and configured the wireless radio, wherein the dedicated management interface antenna receives reconfiguration instructions for the wireless radio, the wireless radio being configured to be reconfigured in accordance with the reconfiguration instructions.

2. The wireless radio according to claim 1, wherein the dedicated management interface antenna broadcasts management signals in 2.4 or 5 GHz frequencies.

3. The wireless radio according to claim 1, wherein the dedicated management interface antenna is directed towards ground level.

4. A method for controlling a wireless radio, the wireless radio comprising a processor and a non-transitory memory for storing executable instructions, the processor executing the instructions to perform the method, comprising:
   transmitting or receiving, on a dedicated management interface antenna of wireless radio management signals, signals in a dedicated band for controlling operations of the wireless radio;
   transmitting or receiving, on at least one additional antenna of the wireless radio management signals, signals that are not used for controlling operations of the wireless radio, wherein the dedicated management interface antenna and the at least one additional antenna are physically separated from one another;
   receiving a reset signal from a technician; and
   power cycling the wireless radio after receiving the reset signal.

5. The method according to claim 4, wherein the dedicated management interface antenna transmits and receives management signals in 2.4 or 5 GHz frequencies.

6. A method for controlling a wireless radio, the wireless radio comprising a processor and a non-transitory memory for storing executable instructions, the processor executing the instructions to perform the method, comprising:
   transmitting or receiving, on a dedicated management interface antenna of wireless radio management signals, signals in a dedicated band for controlling operations of the wireless radio, wherein the signals for controlling operations of the wireless radio comprise a service set identifier (SSID); and
   transmitting or receiving, on at least one additional antenna of the wireless radio management signals, signals that are not used for controlling operations of the wireless radio, wherein the dedicated management interface antenna and the at least one additional antenna are physically separated from one another.

7. The method according to claim 6, wherein the SSID includes a set of characters that indicate to a technician that the wireless radio has been reset.

8. The method according to claim 6, further comprising closing the dedicated band if no client associates with the wireless radio within a predetermined period of time after transmitting the SSID.

9. A method for controlling a wireless radio, the wireless radio comprising a processor and a non-transitory memory for storing executable instructions, the processor executing the instructions to perform the method, comprising:
- transmitting or receiving, on a dedicated management interface antenna of wireless radio management signals, signals in a dedicated band for controlling operations of the wireless radio;
- receiving a unique device identifier from a client that is coupled to the wireless radio on the dedicated band; and
- transmitting or receiving, on at least one additional antenna of the wireless radio management signals, signals that are not used for controlling operations of the wireless radio, wherein the dedicated management interface antenna and the at least one additional antenna are physically separated from one another.

10. The method according to claim 9, wherein the unique device identifier is a serial number of the wireless radio.

11. The method according to claim 9, further comprising authenticating the client.

12. The method according to claim 9, further comprising receiving reconfiguration instructions for the wireless radio.

13. The method according to claim 12, further comprising reconfiguring the wireless radio in accordance with the reconfiguration instructions.

14. A method for controlling a wireless radio, the wireless radio comprising a processor and a non-transitory memory for storing executable instructions, the processor executing the instructions to perform the method, comprising:
- transmitting or receiving, on a dedicated management interface antenna of wireless radio management signals, signals in a dedicated band for controlling operations of the wireless radio, wherein signals for controlling operations of the wireless radio comprise a management user interface (UI) that is transmitted to a client; and
- transmitting or receiving, on at least one additional antenna of the wireless radio management signals, signals that are not used for controlling operations of the wireless radio, wherein the dedicated management interface antenna and the at least one additional antenna are physically separated from one another.

15. The method according to claim 14, wherein reconfiguration instructions are received via the management UI.

* * * * *